(12) United States Patent
Olsen

(10) Patent No.: US 6,180,950 B1
(45) Date of Patent: Jan. 30, 2001

(54) MICRO HEATING APPARATUS FOR SYNTHETIC FIBERS

(76) Inventor: Don Olsen, 405 Talbert Ave., Simi Valley, CA (US) 93065

( * ) Notice: Under 35 U.S.C. 154(b), the term of this patent shall be extended for 0 days.

(21) Appl. No.: 09/114,107

(22) Filed: Jul. 11, 1998

Related U.S. Application Data

(63) Continuation-in-part of application No. 08/647,474, filed on May 14, 1996, now Pat. No. 5,780,524.

(51) Int. Cl.[7] .............................. A61N 5/00; D04H 1/00; D04H 13/00; G21G 5/00
(52) U.S. Cl. ........................................ 250/492.1; 442/327
(58) Field of Search ......................... 250/452.1; 442/327

(56) References Cited

U.S. PATENT DOCUMENTS

| | | | |
|---|---|---|---|
| 3,557,334 * | 1/1971 | Lewis | 219/694 |
| 3,974,016 * | 8/1976 | Bondybey et al. | 156/47 |
| 4,457,817 * | 7/1984 | Bobeth et al. | 264/236 |
| 4,613,470 * | 9/1986 | Aftalion | 264/167 |
| 5,017,423 * | 5/1991 | Bossmann et al. | 442/327 |

* cited by examiner

Primary Examiner—Bruce C. Anderson
(74) Attorney, Agent, or Firm—Frank Frisenda

(57) ABSTRACT

This invention provides an improved apparatus for non-contact quantum mechanical heating of thermoplastic fibers by resonant energy absorption of laser energy by the fiber. In one embodied form, the unique apparatus for continuous heating of thermoplastic fibers comprises a) a laser producing a CO continuous wave laser beam of resonant frequency for the prescribed fiber being treated; b) a mechanism for traversing the fiber to be treated across the path of the laser beam in a prescribed direction to the beam of radiation from the laser source; c) a mechanism for adjusting the rate of traversement of the fiber to maintain the temperature of the thermoplastic fiber within a temperature range of about five percent below the melting point of the thermoplastic fiber to continuously heat the fiber by resonant energy absorption of the laser beam. In a presently preferred embodiment, the unique micro heater apparatus is provided comprising a laser heater furnished with a collimator steering mirror and back reflector, to enhance the heating efficiency of the non-contact quantum mechanical process. The unique micro heater apparatus accordingly provides a source of non-contact heat before, after or during a false twisting process or fiber stretching process.

8 Claims, 10 Drawing Sheets

FIG. 2A

| Properties | Name | Photomicrographs | Fiber type | Breaking tenacity (gpd) | | | | |
|---|---|---|---|---|---|---|---|---|
| Data on fiber properties obtained from the fiber manufacturers. For complete definitions, see ASTM Standards on Textile Materials. | Asterisk denotes trademark | Cross section, 500X Longitudinal, 250X | RT-Reg. tenacity HT-High tenocity IT-Intermediate tenacity | Std. | Wet | Std. loop | Std. knot |
| Polyester A manufactured fiber in which the fiber-forming substance is any long-chain synthetic polymer composed of at least 85% by weight of an ester of a substituted aromatic carboxylic acid, including but not restricted to substituted terephthalate units, $p(-R-O-C-C_6H_4-C-O-)$, and $\parallel$ $\parallel$ $O$ $O$ parasubstituted hydroxybenzoate units, $p(-R-O-C_6H_4-C-O-)$. | *ACE *Compet Allied | | Filament – HT | 9.0 | 9.0 | 6.0–7.0 | 5.0–6.0 |
| | | | Filament – HT | 8.3 | | | |
| | | | Filament – HT | 8.9 | | | |
| | *Dacron Du pont | | Staple & tow | 2.4–7.0 | 2.4–7.0 | 2.1–6.4 | 2.1–6.4 |
| | | | Partially oriented filament | 2.0–2.5 | 2.0–2.5 | | |
| | *Fortrel Wellman | | Filament – RT | 2.8–5.6 | 2.8–5.6 | 2.5–5.2 | |
| | | | Filament – HT | 6.8–9.5 | 6.8–9.5 | 5.6–5.8 | |
| | | | Staple-series 400-RT | 4.8–6.0 | 4.8–6.0 | 4.4–5.6 | |
| | | | Staple-series 300-HT | 6.0–6.8 | 6.0–6.8 | 5.6–6.0 | |
| | *Kodel Eastman | | Partially oriented filament | 2.0–2.5 | 2.0–2.5 | | |
| | | | Staple-series 400-RT | 4.5–5.5 | 4.5–5.5 | 2.8–4.0 | |
| | | | Staple-series 400-HT | 5.3–5.5 | 5.3–5.5 | | |
| | | | Staple-series 400-HT | 6.6 | 6.6 | | |
| | Polyester BASF | | Filament – RT | 4.4–5.0 | 4.4–5.0 | 4.0–4.5 | |
| | *Trevira Hoechst Celanese | | Staple | 3.5–6.0 | 3.5–6.0 | 1.2–5.6 | 2.0–5.6 |
| | | | Partially oriented filament | 2.0–2.5 | 2.0–2.5 | | |
| | | | Filament – HT | 7.2–8.2 | 7.2–8.2 | 4.4–6.7 | 4.0–6.3 |
| | *Cation BASF Structural Materials | | High Strength | 24.1 | 24.1 | | |
| | | | High Modulus | 21.3 | 21.3 | | |
| | | | Ultra-high Modulus | 10.8 | 10.8 | | |
| | Nylon 6 | | Staple | 3.5–7.2 | 3.7–6.2 | 3.8–5.6 | 3.8–5.6 |
| | | | Monofil & filament-RT | 4.0–7.2 | 3.7–3.6 | 2.0–3.0 | 2.0–3.0 |
| | | | BCF-RT | 2.0–4.0 | 1.7–3.6 | | |
| | Nylon 6,6 | | Filament-HT | 6.5–9.0 | 5.8–8.2 | 5.1–10.1 | 4.8–6.7 |
| | | | Staple & tow | 2.9–7.2 | 2.5–6.1 | 3.7–5.9 | 3.7–5.9 |
| | | | Monofil & filament-RT | 2.3–6.0 | 2.0–5.5 | 2.0–5.1 | 2.0–5.1 |
| | | | Filament-HT | 5.9–9.8 | 5.1–8.0 | 5.0–7.6 | 5.0–7.6 |
| Carbon A fiber manufactured by pyrolysis of organic precursor fibers (rayon, polyacrylonitrile or pitch) in an inert atmosphere at 1,000–3,000 C. | | | | | | | |
| Nylon A manufactured fiber in which the fiber-forming substance is a long-chain synthetic polyamide in which less than 85% of the amide (-C-NH-) $\parallel$ $O$ linkages are attached directly to two aromatic rings | | | | | | | |
| Lyocell A manufactured fiber composed of solvent spun cellulose | *Tencel Courtaulds | | High-tenacity | 4.8–5.0 | 3.8–4.2 | 2.2–2.6 | 2.1–2.3 |

FIG. 2B

| Name Asterisk denotes trademark | Elastic Recovery | Average stiffness (gpd) | Average toughness (g cm) | Specific gravity | Moisture regain 70 F, 65% rh % | Moisture regain 70 F, 95% rh % | Effect of heat |
|---|---|---|---|---|---|---|---|
| *ACE | 77 at 5%; 75 at 10% | 55-56 | 0.7 | 1.38 | 0.4 | | A.C.E.: Softens at 464 F. Melts at 500 F. Compet: Melts at 438 F. |
| *Compet Allied | | | 0.9 | 1.38 | 0.4 | | |
| | | | 0.7 | 1.38 | 0.4 | | |
| *Dacron Du Pont | 81 at 3% | 12-17 | 0.20-1.10 | 1.38 | 0.4 | | Sticks at 440 to 445 F. Melts at 482 F. |
| | | | 1.3-1.8 | 1.34 | 0.4 | | |
| | 76 at 3% | 10-30 | 0.40-1.10 | 1.38 | 0.4 | | Melts at 478 to 490 F. |
| | 88 at 3% | 30 | 0.50-0.70 | 1.39 | 0.4 | | |
| *Fortrel Wellman | | | 1.3-1.8 | 1.38 | | | |
| | 75-85 at 2%; 35-45 at 5% | 40 | 1.3-1.8 | 1.38 | 0.4 | | Melts at 490 F. |
| *Kodel Eastman | | 43 | 1.0 | 1.38 | 0.4 | | |
| | | 65 | 1.29 | 1.38 | 0.4 | | |
| Polyester BASF | 55-65 at 5% | 10-30 | 1.1 | | | | Sticks at 440 to 445 F. Melts at 480 to 485 F. Decomposes at 752 F. |
| | | | 0.95 | 1.38 | 0.4 | 0.6 | Softens at 445 to 465 F. |
| *Trevira Hoechst Celanese | 67-86 at 2%, 57-74 at 5% | 7-31 | 0.28-1.50 | 1.38 | 0.4 | 0.6 | Melts at 495 F. |
| | | | 1.3-1.8 | 1.38 | | | |
| | 99 at 1% | 54-77 | 0.35-0.55 | 1.38 | 0.4 | 0.6 | |
| *Celion BASF Structural Materials | 100 | 1,500 | | 1.77 | | | Does not melt. Oxidizes very slowly in air at temperatures above 600 F. |
| | 100 | 2,300 | | 1.77 | | | |
| | 100 | 3,000 | | 1.96 | | | |
| Nylon 6 | 100 at 2% | 17-20 | 0.64-0.78 | 1.14 | 2.8-5 | 3.5-8.5 | Melts at 419 to 430 F. Slight discoloration at 300 F. when held for 5 hr. Decomposes at 600 to 730 F. |
| | 98-100 at 1-10% | 18-23 | 0.67-0.90 | 1.14 | 2.8-5 | 3.5-8.5 | |
| | | | 0.75-0.84 | 1.14 | | | |
| Nylon 6,6 | 99-100 at 2-8% | 29-48 | 0.58-1.37 | 1.13-1.14 | 2.8-5 | 3.5-8.5 | Sticks at 445 F. Melts at 480 to 500 F. Yellows slightly at 300 F. when held for 5 hr. |
| | 82 at 3% | 10-45 | 0.8-1.25 | 1.13-1.14 | 4.0-4.5 | 6.1-8.0 | |
| | 88 at 3% | 5-24 | 0.8-1.28 | 1.13-1.14 | 4.0-4.5 | 6.1-8.0 | |
| | 89 at 3% | 21-58 | | 1.13-1.14 | 4.0-4.5 | 6.1-8.0 | |
| *Tencel Courtaulds | | 30 | 0.34 | 1.56 | 11.5 | | Does not melt. Loses strength at about 300 F & begins to decompose at about 350 F under extended periods of exposure |

FIG. 2C

Properties
Data on fiber properties obtained from the fiber manufacturers. For complete definitions, see ASTM Standards on Textile Materials.

| Name (Asterisk denotes trademark) | Photomicrographs Cross section, 500X Longitudinal, 250X | Fiber type (RT-Reg. tenacity, HT-High tenacity, IT-Intermediate tenacity) | Breaking tenacity (gpd) | | | |
|---|---|---|---|---|---|---|
| | | | Std. | Wet | Std. loop | Std. knot |

Rayon
A manufactured fiber composed of regenerated cellulose, as well as manufactured fibers composed of regenerated cellulose in which substituents have replaced not more than 15% of the hydrogens of the hydroxyl groups.

| Name | | Fiber type | Std. | Wet | Std. loop | Std. knot |
|---|---|---|---|---|---|---|
| *Fibro Courtaulds | | RT–Multi-lobed | 2.3 | 1.1 | | |
| | | IT–0.9 den and up, 0.25 in. and up | 3.0 | 1.5 | | |
| Cuprammonium | | Filament | 1.95–2.0 | 0.95–1.1 | 2.15–2.25 | |
| Rayon North American Rayon Corp. | | Filament–RT | 1.9–2.3 | 1.0–1.4 | | |
| | | Filament–HT | 4.9–5.3 | 2.8–3.2 | | |
| *Saran Pittsfield Weaving | | Monofilament | 1.2–2.2 | 1.2–2.2 | 0.7–1.1 | 1.0–1.7 |

Acetate A manufactured fiber in which the fiber-forming substance is cellulose acetate.

| Acetate | | Filament & staple | 1.2–1.4 | 0.8–1.0 | 1.0–1.2 | 1.0–1.2 |

Sulfar The fiber-forming substance is a long chain synthetic polysulfide with at least 85% of the sulfide linkages attached directly to two aromatic rings

| *Ryton(PPS) Phillips | | Staple | 3.0–3.5 | 3.0–3.5 | | |

Acrylic A manufactured fiber in which the fiber-forming substance is any long-chain synthetic polymer composed of at least 85% by weight of acrylonitrile units ($-CH_2-CH-$) 
                                                                                        $\quad\quad\quad\quad\;\; |$
                                                                                        $\quad\quad\quad\quad\; CN$

| *Acrilan Monsanto | | Staple & tow | 2.2–2.3 | 1.8–2.4 | 1.9–2.3 | 1.9–2.6 |
| *Creslan American Cyanamid | | Staple & tow | 2.0–3.0 | 1.6–2.7 | | |
| *Monacryl Mann Industries | | Staple, tow and pulp | 3.0–4.0 | | | |

Modacrylic Unless rubber or anidex, the fiber-forming substance is a long-chain synthetic polymer containing 35–85% acrylonitrile units.

| *SEF Monsanto | | Staple | 1.7–2.6 | 1.5–2.4 | | 1.6–2.5 |

Olefin A manufactured fiber in which the fiber-forming substance is any long-chain synthetic polymer composed of at least 85% by weight of ethylene propylene or other olefin units

| Polyethylene Hercules | | Monofilament–conventional (low density) | 1.0–3.0 | 1.0–3.0 | | 1.0–2.5 |
| | | Monofilament (incl. flat linear high density) | 3.5–7.0 | 3.5–7.0 | 2.5–4.0 | 2.5–4.5 |
| *Herculon Hercules | | Staple | 3.5–4.5 | 3.5–4.5 | 3.0–4.0 | |

| | | | | | | |
|---|---|---|---|---|---|---|
| *Fibro<br>Courtaulds | | | | 1.53 | | 27 | Does not melt. Loses strength at 300 F and decomposes at 350 to 464 F under extended periods of exposure |
| Cuprammonium | | | | 1.53<br>1.54 | 11<br>11 | 27 | Does not soften, stick or melt. Decomposes at 350 F under extended exposure |
| Rayon<br>North American Rayon Corp. | | | | 1.48–1.54<br>1.48–1.54 | 11<br>11 | | Does not melt. Loses strength at 300 F and begins to decompose at about 325 F. |
| *Saran<br>Pittsfield Weaving | 95 at 5–10% | 5–10 | 0.165–0.265 | 1.7+/–5% | 0 | N/A | Melts at 240–280 F; will not support combustion; self extinguishing |
| Acetate | 48–65 at 4% | 3.5–5.5 | 0.17–0.30 | 1.32 | 6.3–6.5 | 14 | Sticks at 350 to 375 F. Softens at 400 to 445 F. Melts at 500 F. |
| *Ryton (PPS)<br>Phillips | 100% at 2%; 96% at 5%<br>86% at 10% | 10–20 | | 1.37 | 0.6 | | Outstanding resistance to heat(melts at 285 C).<br>Excellent resistance to aerial oxidation, most chemicals.<br>Retains 70%+ original strength to 400 F for 5,000 hr. |
| *Acrilan<br>Monsanto | 99 at 2%; 89 at 5% | 5–7 | 0.4–0.5 | 1.17 | 1.5 | 3–5 | Does not melt. |
| *Creslan<br>American Cyanamid | | 6.0–8.0 | 0.62 | 1.17 | 1.0–1.5 | 2.0–2.5 | Sticks at 430 to 450 F.<br>Safe ironing at 300 F. |
| *Mannocryl<br>Monn Industries | 94 at 1%; 86 at 3%;<br>58 at 10% | 11 | 0.57–0.60 | 1.17 | 1.5–2.5 | 3–5 | Mannocryl producer colored sticks at 490 F. Both are safe ironing at 300 F. |
| *SEF<br>Monsanto | 100 at 1%; 99.5 at 2%<br>99 at 5%; 95 at 10% | 3.8 | 0.5 | 1.35 | 2.5 | | Does not melt. Boiling water shrinkage equals 1%.<br>Excellent resistance to shrinkage in dry heat. At 390 F, 5% shrinkage. |
| Polyethylene<br>Hercules | Up to 95 at 5%; 88 at 10%<br>Up to 100 at 1–10%<br>95 at 5%; 90 at 10% | 2–12<br>20–50<br>20–30 | 0.3<br>1–3 | 0.92<br>0.95–0.96<br>0.90 | Negligible<br>Negligible<br>0.01 | Negligible<br>Negligible | Conv. soft at 225 to 235 F.; melts at 230 to 250 F.<br>Lin.: 240 to 260 F. 255 to 280 F. Conv. shrinks 5–8%<br>at 165 F. 50–60% at 212 F. Lin.: 3–5% at 165 F,<br>8–12% at 212 F. |
| | 96 at 5%; 90 at 10%<br>90–93 at 5%, 80–85 at 10% | 20–30<br>3–10 | 1–3<br>1.5–4 | 0.91<br>0.90 | 0.01<br>–0.1 | | Softens at 285 to 330 F. Melts at 320 to 350 F.<br>Decomposes at 550F. Zero to 5% shrinkage at 212 F;<br>5 to 12% at 265 F.<br>Fiber softens at 300–320 F. Melts at 320–340 F.<br>Decomposes at 550 F. |
| | 92–96 at 5%, 85–90 at 10% | 12–25 | 0.75–3.00 | 0.91 | –0.1 | | Softens at 285–340 F. Melts at 325–340 F.<br>0–5% shrinkage |

FIG. 2D

Properties
Data on fiber properties obtained from the fiber manufacturers. For complete definitions, see ASTM Standards on Textile Materials.

FIG. 2E

| Name<br>Asterisk denotes trademark | Photomicrographs<br>Cross section, 500X<br>Longitudinal, 250X | Fiber type<br>RT-Reg. tenacity<br>HT-High tenacity<br>IT-Intermediate tenacity | Breaking tenacity (gpd) | | | |
|---|---|---|---|---|---|---|
| | | | Std. | Wet | Std. loop | Std. knot |
| *Marvess<br>*Alpha Phillips | | Bulk Filament | 3.0–4.0 | 3.0–4.0 | 2.5–3.5 | |
| *Essera, *Amoco XXV,<br>*Marquesa Lana,<br>Patlon III, Amoco | | Staple & tow<br>Multifilament<br>Multifilament<br>ACF | 2.0–5.0<br>2.5–5.5 | 2.0–5.0<br>2.5–5.5 | | |
| | | Staple | 2.5–3.5<br>2.5–4.0 | 2.5–3.5<br>2.5–4.0 | | |
| *Spectra 900<br>*Spectra 1000 Allied | | Spectra 900<br>Spectra 1000 | 30<br>35 | 30<br>35 | | |
| *Fibrilon<br>Synthetic Industries | | Staple<br>Fibrillated<br>Multifilament – RT | 2.5–5.5<br>3.5–5.0<br>2.5–5.5 | 2.5–5.5<br>2.5–5.0<br>2.5–5.5 | | |
| *Glospan/<br>Cheerspan, S-85 Globe | | Multifilament | 0.7 | | | |
| *Lycra<br>Du pont | | Coalesced monofilament-<br>Types 126, 127<br>Type 128 | 1.0<br>0.8 | | | |
| Glass | 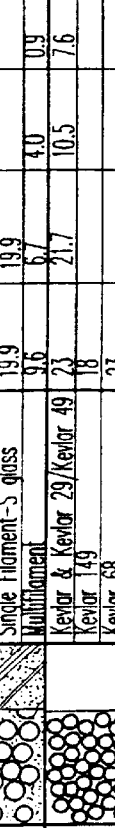 | Single Filament-E glass<br>Single Filament-S glass<br>Multifilament | 15.3<br>19.9<br>9.6 | 15.3<br>19.9<br>6.7 | 4.0<br>10.5 | 0.9<br>7.6 |
| *Kevlar<br>Du Pont | 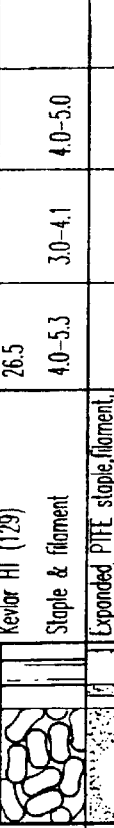 | Kevlar & Kevlar 29/Kevlar 49<br>Kevlar 149<br>Kevlar 68<br>Kevlar HT (129) | 23<br>18<br>23<br>26.5 | 21.7 | | |
| *Nomex<br>Du Pont | | Staple & filament | 4.0–5.3 | 3.0–4.1 | 4.0–5.0 | |
| *Gore-Tex<br>W. L. Gore | | Expanded PTFE staple, filament,<br>tow & slit film – RT<br>TFE multifilament staple, tow<br>& flock | 3.0–4.0<br>0.0–2.0<br>0.5 | 3.0–4.0<br>0.0–2.0<br>0.5 | 2.5–3.3<br>0.8–1.4 | 2.5–3.3<br>0.8–1.4 |
| *Teflon<br>Du Pont | | FEP monofilament | | | | |

Spandex A manufactured fiber in which the fiber-forming substance is a long-chain synthetic polymer comprised of at least 85% of a segmented polyurethane

Glass A manufactured fiber in which the fiber-forming substance is glass

Aramid A manufactured fiber in which the fiber-forming substance is a long-chain synthetic polyamide in which at least 85% of the amide (–C–NH–)
                                                        ‖
                                                        O
linkages are attached directly to two aromatic rings

Fluorocarbon Fiber formed of long-chain carbon molecules, available bonds saturated with fluorine

FIG. 2F

| Material | | | | | | Notes |
|---|---|---|---|---|---|---|
| *Marvess | 96 at 5%, 90 at 10% | 20-30 | 1-3 | 0.91 | 0.01 | 550 F. Zero to 5% shrinkage at 212 F; 5 to 12% at 265 F. |
| *Alpha Phillips | 90-93 at 5%, 80-85 at 10% | 3-10 | 1.5-4 | 0.90 | -0.1 | Fiber softens at 300-320 F. Melts at 320-340 F. Decomposes at 550 F. |
| *Essera, *Amoco XXV, *Marquesa Lana, *Patton III, Amoco | 92-96 at 5%, 85-90 at 10% | 12-25 | 0.75-3.00 | 0.91 | -0.1 | Softens at 285-340 F. Melts at 325-340 F. 0-5% shrinkage at 212 F. 5-12% shrinkage at 265 F. |
| | 85-95 at 5%, 65-90 at 10% | 5-10 | 0.9-1.05 | 0.90-0.91 | 0.01-0.1 | |
| | | | | 0.90-0.91 | 0.01-0.1 | |
| *Spectra 900 | | 1,400 | | 0.97 | Negligible | Melts at about 300 F. |
| *Spectra 1000 Allied | | 2,000 | | 0.97 | | |
| *Fibrilon Synthetic Industries | 93 at 5%, 85 at 10% | | | 0.91 | 0.01 | Fiber softens at 290-310 F. Melts at 290-310 F. Melts at 320 F. and decomposes at 550 F. |
| | 85 at 5%, 75 at 10% | | | | | |
| | 95 at 5%, 85 at 10% | 12-25 | 0.75-3.00 | | | |
| *Glospan/ Cleerspan, S-85 Globe | 99 at 50% (S-7) | 0.17 (S-7) | | 1.2, | Less than 1 | Good dimensional stability. Sticks at 420 F. |
| | 98 at 200% (S-5) | 0.05 (S-5) | | 1.04-1.06 (S-85) | | |
| | | 0.06-0.085 | | | | |
| *Lycra Du Pont | 97 at 50% | 0.13-0.20 | 2.00 | 1.21 | 1.3 | Good dimensional stability. Can be heat set. Sticks at 347-392 F. Melts at 446 F. |
| | 99 at 200% | | | 1.2 | | |
| Glass | 100 | 320 | 0.37 | 2.54-2.69 | None | Up to 0.3 | None burn. At 650 F. E holds 75% tensility; S80%; multi, 50%. E softens at 1,350 to 1,611 F. Melts at 2,050 to |
| | 100 | 380 | 0.53 | 2.48-2.49 | None | Up to 0.3 | 2,160 F. S softens at 1,560 to 1,778 F; melts at 2,720 F. |
| | 100 | 310 | 0.15 | 2.5 | None | Up to 0.3 | |
| *Kevlar Du Pont | 100 at 1%, 2%, 3% | 500/900 | | 1.4 | 4.3 | 6.5/6.0 | Difficult to ignite. Does not propagate flame. Does not melt. Decomposes at about 900 F. |
| | 100 at 1% | 1,110 | | 1.47 | 1.2 | 2.3 | |
| | 100 at 1%, 2% | 780 | | 1.4 | 4.3 | | |
| *Nomex Du Pont | 100 at 1%, 2% | 755 | 0.85 | 1.44 | 4.3 | 12.5 | Does not melt. Decomposes at 700 F. |
| | | 70-120 | | 1.38 | 6.5 | | |
| *Gore-Tex W. L. Gore | | | 0.8-2.2 | | 0 | 0 | Extremely heat resistant. Can be safely used from -350 F to +550 F. Melts at 620 F. |
| *Teflon Du Pont | | 1.2-8.8 | 0.15 | 2.1 | 0 | 0 | (TFE) Extremely resist. Safely used at -350 F to +550 F. Melts at 620 F. (FEP) Highly resist. Melts at 550 F. Sublimation = 0.00002%/hr @ 554 F. Vapors toxic. |
| | | 1.0 | 0.10-0.12 | 2.1 | | | |
| PBI Hoechst Celanese | | 9-12 | 0.40 | 1.43 | 15 | 20 | Will not ignite. Does not melt. Decomposes in air at 360 F. Retains fiber integrity and suppleness upon flame exposure. High char yield |

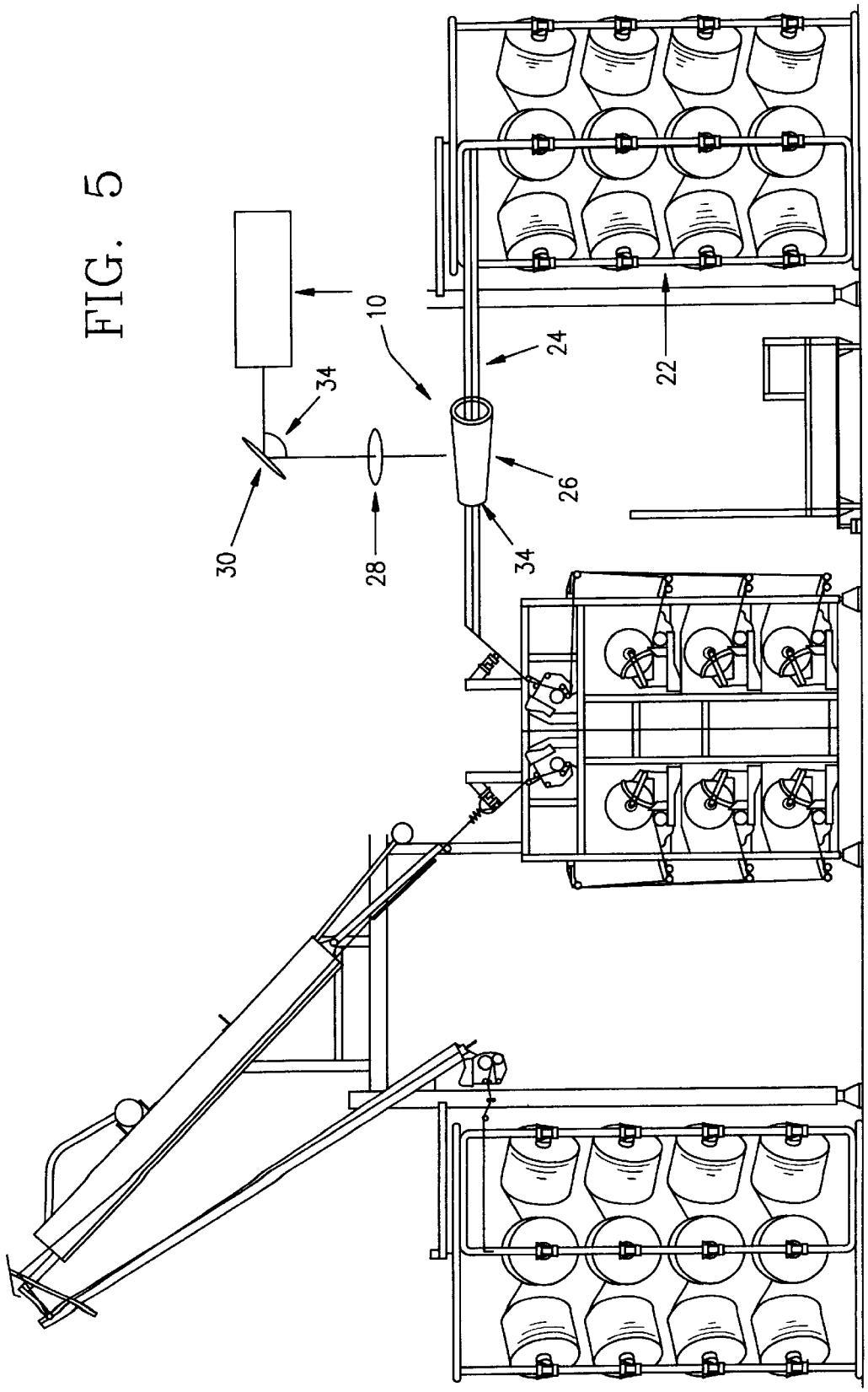

MICRO HEATING APPARATUS FOR SYNTHETIC FIBERS

CROSS REFERENCE TO RELATED APPLICATION

This application is a continuation-in-part of my prior U.S. application Ser. No. 08/647,474, filed May 14, 1996, now U.S. Pat. No. 5,780,524.

BACKGROUND OF THE INVENTION

1. Field of the Invention

The subject invention relates to a unique apparatus for continuous uniform heating synthetic fibers by resonant absorption of laser energy.

2. Description of the Prior Art

Thermoplastic man-made fibers can be permanently heat-set after drawing and orientation. The fiber will possess structural integrity and will maintain its desired configuration below the prescribed heat set temperature. Thermoplastic fibers or yarns from these fibers can be processed with conventional "long" and "short" direct contact heaters used for a variety of purposes in the textile industry. Yarns made from thermoplastic fiber in the form of a continuous filament are capable of a pronounced degree of stretch and rapid recovery and can be subjected to an appropriate combination of deforming, heat setting and development treatments. These yarns can also be bulked.

Twist yarn is made by a continuous process on the false twist principle, where two or more yarns are fed to a twister which inserts extra twist to double them, heat sets the yarns and then untwists the plural yarns and winds them on plural separate spools.

Conventional microfiber production typically consists of taking a higher denier fiber, placing it in a conventional contact heater and then directing the fiber to a drawing machine where it is stretched to a smaller diameter (smaller denier).

Conventional false twist and heat stretching may be accomplished by use of so-called "short heaters" or "long heaters".

The main advantages associated with conventional "short heaters" over "long heaters" include: (1) Relatively shorter yarn paths with the ability to have a truly linear yarn path; (2) Greater flexibility of process parameters and end products; (3) Self-cleaning properties of the heater; and (4) Better textile characteristics at today's existing speeds or higher production speeds and resultant identical textile characteristics.

With conventional "short heater" technology, heater temperatures generally are maintained in a substantially constant range regardless of the type of yarn or denier. For example, heavier denier polyester is typically heat treated within a temperature range of between about 205 degrees C. to about 215 degrees C. Higher temperature levels will generally vary with the type of raw material, the total denier, the denier per filament and the linear speed, thereby having a direct positive effect on reduction of power consumption. In addition, the consumed power of the high temperature short heater without yarn is dramatically reduced compared to today's conventional long heater technology on the basis of the much shorter length of 600 mm verses the 2,500 mm of the long heater. Typically, the heater surface in contact with the atmosphere is reduced four to five times, thereby minimizing loss of heat with a resultant decrease in consumed energy.

Conventional processing heaters, however, typically utilized direct-contact heat, for instance, a heated metal plate to heat the fiber. Such heaters are relatively inefficient because they heat not only the fiber being processed, but also the surrounding area. Additionally, conventional heaters are generally two to three meters in length, requiring relatively large processing area to accommodate such equipment.

Laser treatment of fibers is also known to the art. For instance, Japanese Patent No. 59-157,310 relates to a thick and thin synthetic fiber and a method for its manufacture. A method for manufacturing the thick fiber is disclosed having variations in refractive index in the direction of the fiber access and thick and thin sections which is characterized by the fact that the oriented thermoplastic synthetic fiber is subject to intermittent irradiation with laser light under tension. Accordingly, the Japanese patent disclosure is directed to varying the diameter of the fiber over its length by means of an intermittent heating or pulse heating to portions of the fiber.

Bossman, et al. in U.S. Pat. No. 5,017,423 discloses the use of a laser to remove material from the fiber that is to be treated to reduce the denier.

Macken, et al. in U.S. Pat. No. 4,156,124 discloses image transfer laser engraving. The Macken, et al. apparatus and method relies upon indexing of the work piece in relation to the pattern mask.

Kajikawa, in U.S. Pat. No. 4,950,862 discloses laser machining apparatus using a focusing lens array to delivery laser energy to the sample being treated.

Accordingly, there exists a need for an improved method and apparatus which will produce an even heating of the fiber in a uniform manner. Those skilled in the art have recognized a significant need for an improved process and apparatus for even and continuous heating to produce false twist and/or diameter reduction of the fiber such as by stretching, so that it results in a microfiber. Moreover, those skilled in the art recognized a significant need for processing equipment which will reduce the size of conventional "long heaters" and "short heaters" and which will be energy efficient. The present invention fulfills these needs.

SUMMARY OF THE INVENTION

This invention provides an improved apparatus for non-contact quantum mechanical heating of thermoplastic fibers by resonant energy absorption of laser energy by the fiber.

In a presently preferred embodiment, the unique micro heater apparatus comprises a laser furnace furnished with a collimator and back reflector, employed to enhance the efficiency of the invention. In this respect a collimated laser beam with back reflector, i.e., "Laser Heater" is provided. The inventive Laser Heater will have a traversement path of from about 127 mm to 1M in length and will be about 50 mm to 101 mm in diameter. In false twist processing, the Laser Heater can be a source of non-contact heat before, after or during the false twisting process. For this process separate laser beams are utilized for each yarn processed.

For the diameter reduction of the yarn, several yarns are drawn through the Laser Heater at one time. Typically, the non-contact heat zone is from about 127 mm to about 1M in length and from about 50 mm to about 101 mm in diameter with approximately no more than 5% variance in heat from the center to the outer circumference of the furnace. Several yarns can accordingly be drawn through the heat zone at one time.

In the foregoing diameter reduction embodiment, the established heating zone is established between one or more spools of yarn on each side. Accordingly, the diameter reduction of the yarn(s) being drawn through this Laser Heater is a function of three factors (1) the adjusted heat in the Laser Heater, (2) the draw tension on the yarn(s) and, (3) the traversement speed of the yarn(s).

The wavelength of laser energy for the heat treatment will vary depending upon the thermoplastic fiber to be process. Accordingly, the wavelength can range from Infrared (IR) to visible/Ultraviolet of the Electromagnetic spectrum depending upon the absorption spectrum of the particular fiber. The heating of the fiber results from exciting it to a higher energy state by absorption of a resonant wavelength. This energy has to be eventually dissipated so the fiber (a molecular polymer) can relax to a stable ground state. This relaxation process is dependent on the type of laser energy utilized. For visible/Ultraviolet, the energy is released through fluorescence (non heat), and internal conversion to IR energy which eventually becomes classical heat (all wavelengths). For IR absorption, the energy eventually converts on hundred percent to classical heat within the cell, thus, evenly heating fibers for conventional machine processes (i.e., drawing and false twisting).

This invention may be used to heat a wide variety of thermoplastic fibers including but not limited to, *A.C.E., *Compet, *Dacron, *Fortrel, *Kodel, Polyester, *Trevira, *Celion, Nylon 6, Nylon 6,6, *Tencel, *Fibro, Cuprammonium, *Saran, Acetate, *Ryton (PPS), Phillips, *Acrilan, *Cresian, *Mannacryl, *SEF, Polyethylene, *Herculon, *Marvess, *Alpha, *Essera, *Amoco XXV, *Marquesa Lana, Patlon III, *Spectra 900, *Spectra 1000, *Fibrilon, *Glospan/Cleerspan, S-85, *Lycra, Glass, *Kevlar, *Nomes, *Gore-Tex, *Teflon and PBL.

In one embodied form, the unique method for continuous heating of thermoplastic fibers comprises the steps of: a) preparing a thermoplastic synthetic fiber for heat treatment; b) illuminating the fiber with a beam of radiation from a Co continuous wave laser beam of resonant frequency for the prescribed fiber being treated; c) traversing the fiber to be treated across the path of the laser beam in a direction perpendicular to the beam of radiation from the laser source; d) adjusting the rate of traversement of the fiber to maintain the temperature of the thermoplastic fiber within a temperature range of below about five (5%) of the melting point of the thermoplastic fiber to continuously heat the fiber by resonant energy absorption of the laser beam.

*denotes trademark.

BRIEF DESCRIPTION OF THE DRAWINGS

FIGS. 2A through 2F are charts depicting typical melting points for thermoplastic fibers to be treated in accordance with the present invention;

FIG. 5 is a schematic diagram of a heater system incorporating the unique micro heater cell.

DETAILED DESCRIPTION OF THE INVENTION

Figure 1:
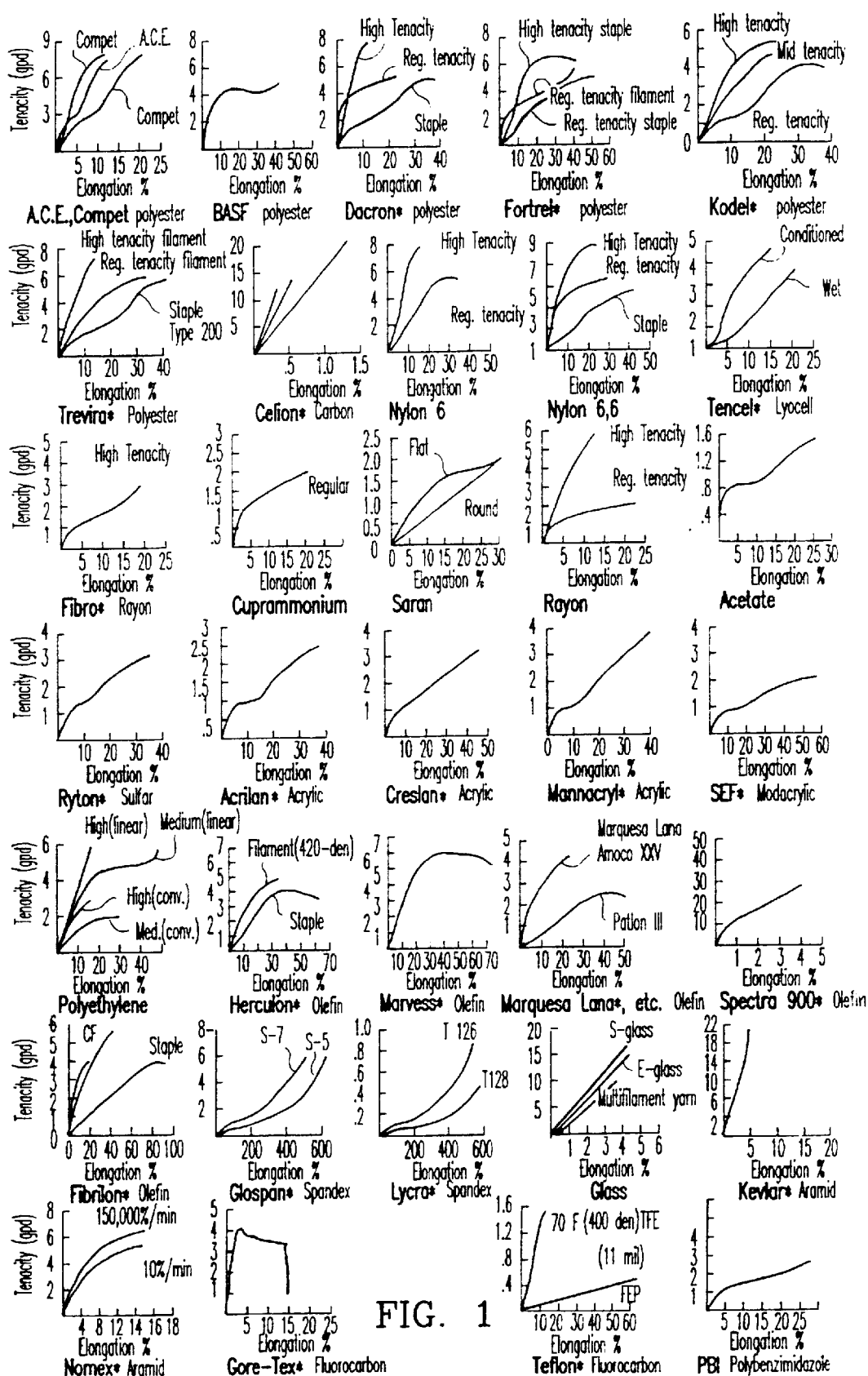
FIG. 1 is an illustration of typical stress-strain curves of various thermoplastic fibers to be treated in accordance with the present invention.

This invention provides an improved method and apparatus for non-contact quantum mechanical heating of thermoplastic fibers by resonant energy absorption of laser energy by the fiber.

In a presently preferred embodiment, the unique micro heater apparatus is a laser heater furnished with a collimator and back reflector, employed to enhance the efficiency of the invention. In this respect a collimated laser beam with back reflector, i.e., "Laser Heater" is provided. The inventive Laser Heater will have a traversement path of from about 127 mm to 1M in length and will be about 50 mm to 101 mm in diameter. In false twist processing, the Laser Heater can be a source of non-contact heat before, after or during the false twisting process. For this process separate laser beams are utilized for each yarn processed.

For the diameter reduction of the yarn, several yarns are drawn through the Laser Heater at one time. Typically, the non-contact heat zone is from about 127 mm to about 1M in length and from about 50 mm to about 101 mm in diameter with approximately no more than 5% variance in heat from the center to the outer circumference of the heater. Several yarns can accordingly be drawn through the heat zone at one time.

Laser Heater is a replacement heater for a conventional drawing machine or other conventional texturing machine.

The wavelength of laser energy for the heat treatment will vary depending upon the thermoplastic fiber to be process. Accordingly, the wavelength can range from Infrared (IR) to visible/Ultraviolet of the Electromagnetic spectrum depending upon the absorption spectrum of the particular fiber. The heating of the fiber results from exciting it to a higher energy state by absorption of a resonant wavelength. This energy has to be eventually dissipated so the fiber (a molecular polymer) can relax to a stable ground state. This relaxation process is dependent on the type of laser energy utilized. For visible/Ultraviolet, the energy is released through fluorescence (non heat), and internal conversion to IR energy which eventually becomes classical heat (all wavelengths). For IR absorption, the energy eventually converts on hundred percent to classical heat within the cell, thus, evenly heating fibers for conventional machine processes (i.e., drawing and false twisting.

This invention may be used to heat a wide variety of thermoplastic fibers if a commercially available laser exists, including but not limited to, *A.C.E., *Compet, *Dacron, *Fortrel, *Kodel, Polyester, *Trevira, *Celion, Nylon 6, Nylon 6,6, *Tencel, *Fibro, Cuprammonium, *Saran, Acetate, *Ryton (PPS), Phillips, *Acrilan, *Cresian, *Mannacryl, *SEF, Polyethylene, *Herculon, *Marvess, *Alpha, *Essera, *Amoco XXV, *Marquesa Lana, Patlon III, *Spectra 900, *Spectra 1000, *Fibrilon, *Glospan/ Cleerspan, S-85, *Lycra, Glass, *Kevlar, *Nomes, *Gore-Tex, *Teflon and PBL.

*denotes trademark.

In one embodied form, the unique method for continuous heating of thermoplastic fibers comprises the steps of: a) preparing a thermoplastic synthetic fiber for heat treatment; b) illuminating the fiber with a beam of radiation from a CO continuous wave laser beam of resonant frequency for the prescribed fiber being treated; c) traversing the fiber to be treated across the path of the laser beam in a direction perpendicular to the beam of radiation from the laser source; d) adjusting the rate of traversement of the fiber to maintain the temperature of the thermoplastic fiber within a temperature range of below about five (5%) of the melting point of the thermoplastic fiber to continuously heat the fiber by resonant energy absorption of the laser beam.

In this respect, FIG. 1 illustrates typical stress-strain curves of various thermoplastic fibers to be treated in accordance with the present invention. Accordingly, the present invention provides a non-contact quantum mechanical heating process utilizing selective resonance energy heating technology. In this regard, infrared (IR) or visible/ultraviolet (UV) wavelength energy is utilized for the heating source. The thermoplastic fiber is excited to a higher energy state by absorption of laser energy of a resonance wavelength. This energy is eventually dissipated so the fiber (a molecular polymer) can relax to the stable ground state. The relaxation process involves the release of energy through fluorescence, and/or internal energy conversion to IR energy which becomes classical heat. It is this conversion process where: 1) the visible/UV absorbed energy in a electronic state interconverts through a vibronic state (a combination vibrational and electronic state) to internal heat that eventually through the classical laws of physics becomes classical heat (i.e., heat transfers from a hot to a cold body), or 2) the IR absorbed energy in a vibrational manifold transforms into classical heat.

The following generic polymer continuous filament fibers and their respective melting points are set forth below:

| Polyester | 490 degrees F. |
| Acrylic | 440 degrees F. |
| Nylon | 425 degrees F. |
| Olefins | 235 to 350 degrees F. |
| Polypropylene | 335 degrees F. |

FIGS. 2a through 2f are charts setting forth typical melting points for specific species of fibers within the foregoing classes.

The advantages of the inventive laser heating method are as follows:

1. The physical size of the machine will be reduced;
2. Its operation will be cost effective and energy efficient;
3. Higher productivity, because of faster machine speeds;
4. Better yarn quality control, because of more even and consistent heat control.

The preferred temperatures range for this procedure is 15 to 20 degrees below the melting point to each fiber.

Figure 3:
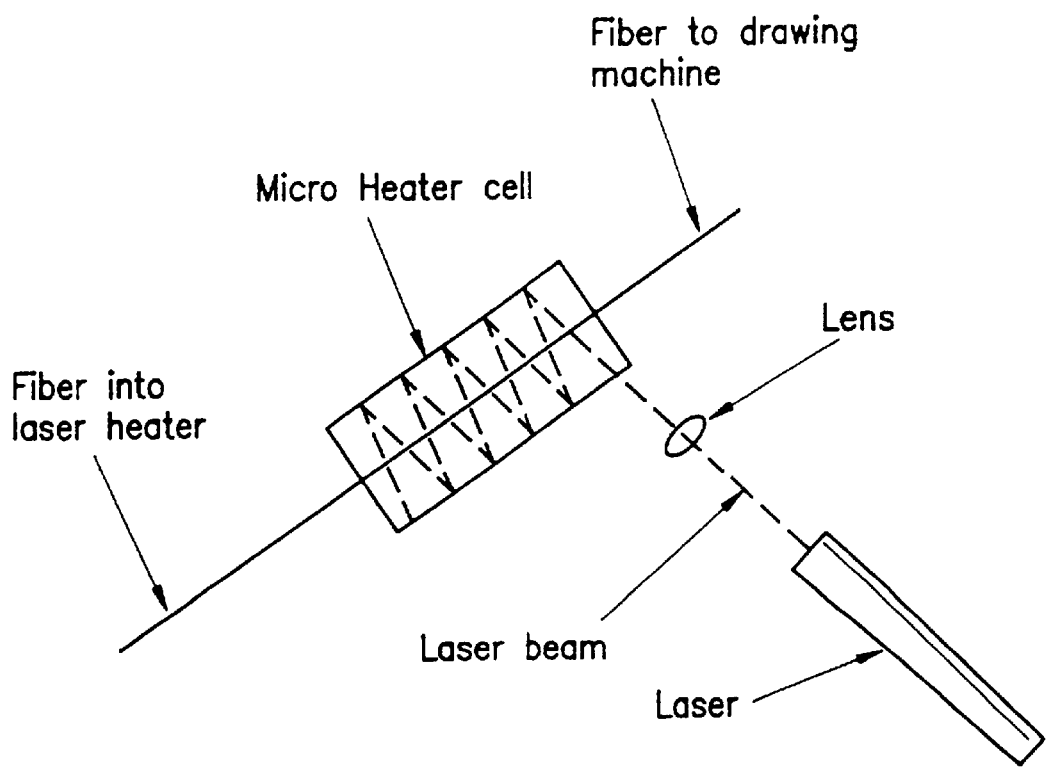
FIG. 3 is a schematic diagram of one embodied laser heater in accordance with the present invention.

FIG. 3 illustrates a presently preferred embodiment, wherein the unique micro heater 10 consists of a heater cell 12 and a laser 14 with its appropriate optical train (correct bandwidth transmission) as the source. The laser heater is approximately 0.0762 meters in length and is constructed of surface metal. The outside housing of the heater is thermally insulated to prevent the loss of heat to the external surroundings. Optionally, the internal surface of the laser housing may be treated with a reflective coating that is wavelength dependent. This coating can be designed for either specular or diffuse reflection of the laser energy beam 16. The number of specular reflections 18 will be controlled by the orientation of the laser heater 12 with respect to the laser beam 16. Thus, as the angle approaches eighty-nine degrees the number of reflections traversing the length of the cell internally, greatly increases as depicted in FIG. 3.

The wavelength is determined by the absorption spectrum for the fiber being processed. From observation of this absorption spectrum, the strongest discreet absorption bands can be ascertained.

Figure 4:
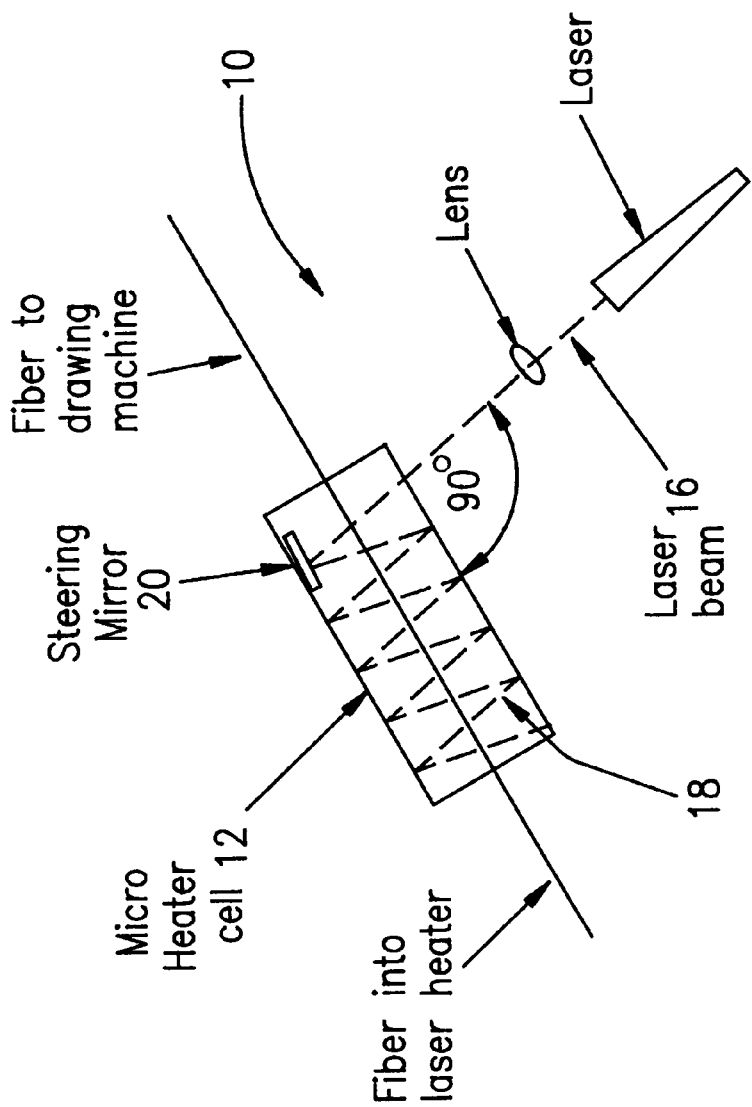
FIG. 4 is a schematic diagram of a second embodied apparatus in accordance with the present invention depicting a steering mirror to adjust the angle of incidence of the laser beam within the unique microheater cell.

As shown in FIG. 4, a second embodied apparatus in accordance with the present invention, includes a steering mirror 20 to adjust the angle of instance of the laser beam 16 directed to the microheater cell 12. Preferably the angle of incidence is 90 degrees, i.e., perpendicular to the internal reflective coating provided on the micro heater cell 12. However, this angle of incidence may be adjusted to achieve the desired number of specular reflections 18, impacting the fiber into the laser heater system 10.

In one embodied form the mirror 20 is parallel to a plane that is perpendicular to the propagation of the laser beam 16. The mirror 20 will be permanently set at an angle from the range of zero (0) to fifteen (15) degrees for the purpose of controlling the number of passes of the laser beam through a fiber inside our designed heat cell.

The following metals and dielectric reflective coatings can be used for construction of the inventive micro heater cell:

| Metal | Coatings |
|---|---|
| Aluminum | Enhance Aluminum |
| Silver | Enhance Gold |
| Gold | Protected Gold |
| Copper | Protected Silver |
| Molybdenum | Enhanced Silver |
| Cast Iron | |
| Any Steel | |

As shown in FIG. 5, conventional creel 22 are used to store the fiber 24 prior to heating by the inventive laser heating system 10. The system comprises the micro heater cell 26, lens 28, and steering mirror 30 to adjust the angle of incidence from the laser 32. After heating and exist from the micro heater cell 34, the fiber can be further heated by conventional mechanisms, i.e., for drawing denier reduction and false twists.

A resonant frequency in the range of 5.73 to 5.87 micrometer is preferred for illuminating the fiber with a beam of radiation from a carbon monoxide continuous wave laser beam.

Depending on the design, a suitable optical train can be a lens, beam expander (for multiple fiber processing) or fiber optics. By control of the speed of the given fiber, such as by conventional adjustable winding spools, traversing the micro heater and the energy of the laser beam, the temperature of the fiber can be regulated so that the fiber constantly remains at the specified temperature range just below its melting point. At this temperature, conventional fiber processing (i.e., drawing denier reduction and false twist) possible.

In the presently preferred embodiment the laser heater apparatus has an effective length of approximately 0.0762 meters and utilizes a carbon monoxide laser for denier reduction of polyester fibers. Thus, the physical size of the machinery is greatly reduced with consequent savings in operating and overhead costs. As the inventive technology involves quantum mechanical heating, the processing rate is vastly improved over conventional technology.

ILLUSTRATIVE EXAMPLE

A micro heater for polyester fiber that utilizes carbon monoxide infrared laser energy of a wavelength of 5.7 to 5.9 microns for non-contact quantum mechanical hearing of polyester fiber is illustrated in FIG. 4. This heating is through resonant energy absorption of the laser energy by the fiber. This is a replacement heater for existing heaters on Polyester fiber textile texturing machines. This heater consists of a cylindrical cell which is traversed by the fiber. The laser beam is focused on the traversing fiber in the cell, at an orientation ranging from sixty to ninety degrees to the cell—depending on how many reflections of the laser beam are desired in the cell. The cell is constructed of copper and its length ranges from 127 to 254 mm and a diameter from about 50 to 100 mm depending on the laser power and energy density impinged on the fiber, or fibers if it is processing multiple fibers concurrently. The cell has an internal reflective coating of Enhanced Gold that is designed to optimize reflectance at a specific wavelength. The enhancing layer also greatly improves durability and is sensitive to wavelength, angle of incidence and polarization. Also, it helps to enable maximum absorption of the laser energy by the fiber due to optimized multiple reflections of the laser beam, within the cell. The rate of traversement of the fiber controls the temperature of the fiber for a given laser energy density focused on the fiber.

While this one particular form of the invention has been illustrated and described, various modifications can be made without departing from the spirit and scope of the invention. Accordingly, it is not intended that the invention be limited, except as by the appended claims.

What is claimed is:

1. An improved apparatus for non-contact quantum mechanical heating of a thermoplastic fiber by resonant energy absorption of laser energy by the fiber, the apparatus comprising in combination:

a) means for illuminating at least one thermal plastic fiber with an intense light source from a carbon monoxide continuous wave laser beam of resonant frequency for the prescribed fiber being treated; said means comprising a microheater cell having an internal reflective coating which is wave-length dependent on the laser beam;

b) means for traversing the fiber to be treated across the path of the laser beam in a direction perpendicular to the beam of radiation from the laser source; and c) means for adjusting the rate of traversement of the fiber to maintain the temperature of the thermoplastic fiber within a temperature range of about five percent below the melting point of the thermoplastic fiber to continuously heat the fiber by resonant energy absorption of the laser beam.

2. The apparatus as defined in claim 1, wherein said internal reflective coating effects specular reflection of the laser beam.

3. The apparatus as defined in claim 1, wherein said internal reflective coating effects diffuse reflection of the laser beam.

4. The apparatus as defined in claim 3, and further comprising an optical train for directing the laser beam with respect to said internal reflective coating.

5. The apparatus as defined in claim 4, wherein said optical train comprises a lens.

6. The apparatus as defined in claim 1, wherein said optical train comprises a beam expander.

7. The apparatus as defined in claim 1, wherein said optical trans comprises fiber optics.

8. The apparatus as defined in claim 1, wherein said means for traversing the fiber is at least one adjustable winding spool.

* * * * *